Figure 4:
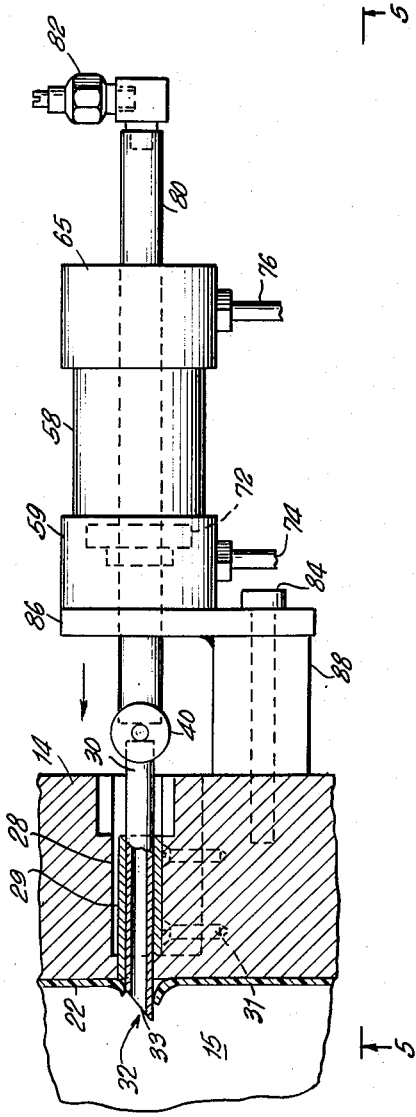

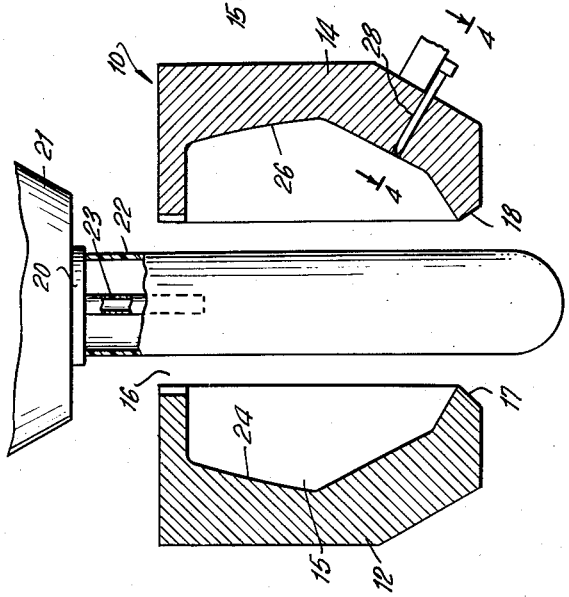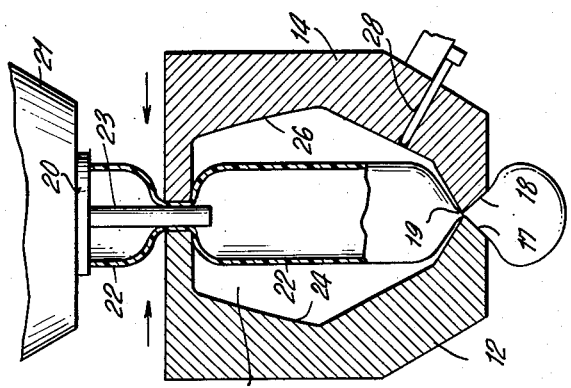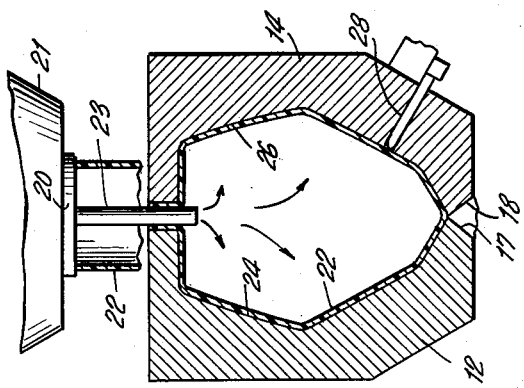

Dec. 24, 1963  R. PELIKAN  3,114,931
INTERNAL AIR COOLING OF BLOW MOLDED ARTICLES
Filed Oct. 17, 1961  2 Sheets-Sheet 2

INVENTOR.
ROLF PELIKAN
BY
ATTORNEYS

United States Patent Office 3,114,931
Patented Dec. 24, 1963

3,114,931
INTERNAL AIR COOLING OF BLOW MOLDED
ARTICLES
Rolf Pelikan, New York, N.Y., assignor to Ideal Toy
Corporation, Hollis, N.Y., a corporation of New York
Filed Oct. 17, 1961, Ser. No. 145,574
11 Claims. (Cl. 18—5)

The present invention relates to a process of blow molding and to an apparatus for producing blow molded articles.

In conventional blow molding of an article, air is blown into a heated hollow thermoplastic tube and the tube is caused to expand against the walls of a mold to form hollow articles of any desired shape and size in a convenient manner. A considerable period of time for cooling is needed before the blown article can be removed from the mold. This because the heated plastic tube transfers a quantity of heat to the mold and the compressed fluid which is used to expand the tube against the inner walls of the mold is also at a raised temperature and further adds to the heat which is retained by the metallic walls of the mold, and with the successive molding operations, the mold walls themselves achieve an elevated temperature.

It is therefore, an important object of the present invention to provide means for speeding up the cooling of both the article within the mold and of the mold walls.

A further object of the invention resides in the provision of means for enabling continuous blowing of a stream of air under pressure into a mold so that the stream of air may serve to cool both the article formed in the mold as well as the mold.

An additional object of the invention resides in the provision of means for facilitating the cooling of a mold which does not cause any substantial increase in size or weight of the mold, which may be easily operated by pneumatic or other fluid operated means, and which permits the mold to be used in a conventional manner if it is not desired to employ the improved cooling means.

In carrying out the invention a plastic hollow tube is introduced into a mold and air is then introduced into the tube under pressure to expand the tube to conform to the contour of the mold. Simultaneously with the later stages of expanding the tube, a needle forming an exhaust or relief conduit is moved into the mold cavity to pierce the article being molded from the expanded tube so that the air being blown into the article will pass through the relief conduit. Valve means are connected to the relief conduit for maintaining suitable pressure within the mold cavity. There is employed for moving the needle into and out of the mold cavity a pneumatically operated piston which itself is hollow and which is connected to the relief conduit.

Still another object of the invention resides in the provision of cooling means for use in blow molding articles which enables the articles to be more readily and speedily removed from a mold and which are especially adapted for use in blow molding doll's bodies, balls, other types of toys, and various other articles.

An additional object of the invention is to speed up the process of blow molding an article by reducing the time necessary for cooling the article to a sufficiently low temperature which allows a mold to be opened and the article removed.

A special feature and advantage of the invention lies in the fact that not only is the blow molding process speeded up by the application of a continuous stream of cooling air, but the cooling air presses the article being molded against the inner walls of the mold continuously and in a manner to insure a true reproduction of the contour of the mold, thus resulting in a better product with finer detail.

Still further objects and features of this invention resides in the provision of an apparatus for internal air cooling of blow molded articles that is simple in construction, easy to utilize, which may be arranged for automatic movement in timed relationship with respect to the other parts of the mold, and which may be employed in connection with various existing blow molding apparatus.

Figure 5:
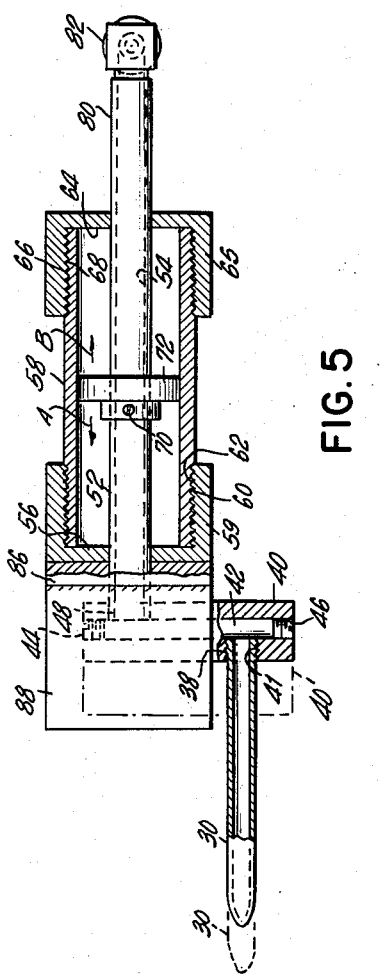

These, together with the various ancillary objects, and features of the invention which will become apparent as the description proceeds, are attained by this process of blow molding and apparatus for providing internal air cooling of blow molded articles, a preferred embodiment of which has been illustrated in the accompanying drawings, by way of example only, wherein:

FIGS. 1 to 3 inclusive are elevational schematic sectional views through a mold constructed in accordance with the concepts of the present invention illustrating various steps of the process;

FIG. 4 is an enlarged sectional detailed view taken along the line 4—4 in FIG. 1 illustrating the construction of the means for driving the needle so as to pierce the article being molded; and FIG. 5 is an elevational view taken along line 5—5 in FIG. 4 with parts being broken away to show other parts of the invention with greater clarity.

With continuing reference to the accompanying drawings, wherein like reference numerals designate similar parts throughout the various views, there is shown a mold 10 adapted for use in blow molding which includes a pair of co-operating mold sections 12 and 14. When closed, the sections 12 and 14 form a cavity 15 with a neck opening 16. The bottoms of the mold sections are beveled at 17, 18, and come together at 19 when the mold sections are closed as in FIG. 2 in order to seal the lower end of the hollow plastic tube 22.

The tube 22 is extruded by and from an extrusion nozzle 20 carried by an extrrusion head 21 of an extruding machine. Also carried by the extrusion head 21 centrally of the extrusion nozzle and adapted to extend within the tube 22 is an air pipe 23 which is hollow and which is connected to a source of fluid under pressure which may include air under compression from an air compressor. The extruding machine feeds from the extrusion head 21 and extrusion nozzle 20 the tube 22 in a preheated state. Each of the mold sections 12 and 14 have inner walls 24, 26 contoured to conform with the outer surface of the desired shape of the article to be molded. The mold sections may be secured together during the blow molding process by any convenient and conventional means.

Once the compressed air has been introduced into the tube 22, the heated portions of the tube 22 within the mold will expand to conform with the contour of the inner walls 24 and 26 and the air under pressure will hold the expanded tube against the inner walls 24, 26 of the mold. This compressed air is at an elevated temperature due to the fact that it is under pressure and in addition heat from the tube itself will be transmitted to the compressed air and to the walls 24 and 26 raising the temperature of the mold 10.

The mold connot be opened while the article is still soft due to its elevated temperature and there will be an undesirable reduction in rate of production caused by the time required for the mold to cool sufficiently to allow the article to cool and become at least partially set. In order to provide for rapid cooling of the article and the mold, the mold section is provided with a bore 28 therein which is lined with a sleeve or bracket 29 held in position by screws 31 or other fasteners. A needle 30 is adapted to be moved within the sleeve or bracket 29. The sleeve 29 opens as at 32 into the mold cavity 15 defined by the inner walls 24 and 26 and is shaped to assure that the point 33 of the needle 28 is carefully guided as it is fed in through the opening 32.

The needle 30 is externally threaded on its outermost end as at 38 for threaded connection with a block 40 internally threaded as at 41 and having a passageway 42 therein. The passageway 42 extends the length of the block 42 and is sealed at each end by suitable threaded plugs 44 and 46. The block 40 is further internally threaded as at 48 for reception of the externally threaded ends 50 of a piston rod 52. The piston rod 52 is provided with a bore 54 extending all the way therethrough. Thus, the needle 30 communicates with the piston rod 52 by means of the passageway 42.

The piston rod 52 extends through the end wall member 56, the end wall member 56 being provided with a cylindrical flange 59 which is externally threaded at 60 for threaded engagement with the external threading 62 on a cylinder 58. A further end wall member 64 is provided with a cylindrical flange 65 which is internally threaded as at 66 for threaded reception of the external threading 68 on the cylinder 58. The end wall member 64 is provided with an opening therein through which the free end 80 of the piston rod 52 extends. By means of any suitable fastener such as a set screw 70 a piston 72 is adjustably secured on the piston rod 52 or may be fixed thereto during the manufacture thereof.

Connected to the flange 59 of the end wall member 56 is a conduit 74 while a further conduit 76 is connected to the flange 65 of the end wall member 64. By means of the conduit 74 and 76, fluid may be introduced on either side of the piston 72 to drive the piston selectively in either direction. Fluid fed in through the conduit 74 will cause the piston 72 to move in the direction indicated by arrow B while the piston 72 will be moved in the direction indicated by arrow A by fluid introduced through conduit 76.

Bolt 84 together with a mounting plate 86 and a spacer block 88 are used for securing the cylinder 58 and associated elements to the block 27 and hence to the mold 10. A valve 82 is provided on the free end 80 of the piston rod 52.

In operation, the hollow tube 22 of synthetic plastic material is extruded through the extrusion nozzle 20 in a plastic heated state. The tube 22 is introduced into the mold cavity 15 with the mold sections 12 and 14 opened and with the needle 30 in a retracted position as shown in FIGS. 1 and 4. Then, the mold sections 12 and 14 are closed as shown in FIG. 2. The portions of the mold sections 12 and 14 defined by the neck opening 16 press the adjacent portions of the tube 22 against the air pipe 23. At the same time the beveled edges 17 and 18 at the bottoms of the mold seal the leading end of the tube 22 by tightly pinching the tube 22 facilitating the trimming of excess material.

The tube 22 is in a condition of plasticity to permit expansion and setting in a predetermined form. After the mold has closed to the position of FIG. 2, air is introduced through the air pipe 23 into the tube 22 and the tube 22 is expanded against the walls 24 and 26 of the mold sections 14 and 16. Then, air is introduced through the conduit 76 behind the double acting piston 72 to force the piston to move from the position illustrated in FIG. 5 so that the needle 30 is driven into the mold cavity 15 piercing the expanded tube 22 as it is assuming the final shape of the article being molded. Air is continuously introduced under pressure through the air pipe 23. The pressure within the mold cavity 15 will be decreased after the needle 30 has pierced the expanded tube 22 due to the fact that the needle 30 now provides a means of partially releasing the compressed air within the expanded tube 22 through the needle 30 and the valve 82. The valve 82 is adjustable and its setting will determine the pressure maintained within the mold cavity 34 after the needle 30 has pierced the expanded tube 22. The value 82 is adjusted in accordance with other conditions of operation of the molding apparatus to achieve an optimum working pressure.

An unusual and unexpected result is achieved by the invention arising from the fact that the material from which the article is being molded has a different specific heat from the specific heat of the mold walls and other different thermal characteristics. Because of this there will be a slightly quicker cooling of the article than of the mold walls causing the article to release itself from the mold walls as soon as the mold is opened, further increasing the speed of operation of this apparatus. After the mold has been opened and the article removed therefrom it will be in condition for further processing or styling as may be desired.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A process of molding comprising the steps of heating a tube of plastic material, introducing a portion of said tube into a mold, blowing air into said tube within said mold to expand said tube to conform to the shape of the inner walls of said mold, then, at a location removed from the location of the air entry, moving a relief conduit from outside the inner walls of said mold to within the inner walls of said mold piercing said expanded tube while blowing air into said expanded tube to hold said expanded tube against said inner walls to form a molded article while simultaneously cooling said expanded tube and said mold, and then removing said article from said mold.

2. The process of claim 1 wherein said air is blown under pressure continuously from said tube through said conduit.

3. A molding apparatus comprising a pair of mold sections having inner mold walls defining a mold cavity, an opening in said mold sections, means for introducing a tube of plastic material through said opening into said mold cavity, means for supplying air continuously into said tube at said opening to blow said tube against said inner mold walls to form an article, one of said mold sections having a bore therein at a location removed from said opening, a pointed hollow needle for serving as a relief conduit movably positioned in said bore, and operating means attached to said needle for driving said needle through said article and into said mold cavity for drawing air from within said article to cool said article and said mold sections.

4. A molding apparatus according to claim 3, wherein said operating means includes a cylinder, a piston in said cylinder, a piston rod secured to said piston and extending through said cylinder, said piston rod being secured to said conduit, and means for supplying fluid to said cylinder for moving said piston and said needle.

5. A molding apparatus according to claim 4 wherein said piston rod is hollow and communicates with said needle, and valve means on said piston rod for controlling air pressure in said mold cavity.

6. An apparatus according to claim 5 including valve means on said piston rod for controlling air pressure in said mold cavity.

7. An apparatus for blow molding articles of plastic material comprising an openable mold having inner mold walls defining a mold cavity, means in said mold for introducing into said mold cavity a heated tube of plastic material, means for supplying air continuously under pressure into said tube to blow said tube against said inner mold walls to form an article, said mold having a bore therein at a location removed from said air supply means, a relief conduit movably positioned in said bore, and pneumatically operated means attached to said relief conduit for driving said relief conduit through said article end into said mold cavity, for drawing air from within said article to cool said article and said mold sections, said pneumatically actuated means including a cylinder, a piston in said cylinder, a hollow piston rod secured to said piston and extending therethrough, said cylinder having two ends, said piston rod extending through both ends of said cylinder, means connecting said conduit to said piston rod, and means for selectively supplying air to each end of said cylinder to move said piston and hence said conduit towards and away from said mold cavity.

8. A process of blow molding comprising the steps of heating a tube of plastic material, introducing said heated tube into a mold, blowing air at a first pressure into said tube to expand said tube at one end thereof to conform to the contours of said mold to form an article at a location removed from said one end, piercing said article with a relief conduit while continuously blowing air into said article and maintaining the air within said article at a second pressure to hold said article against said mold while simultaneously passing cooling air from said one end to said removed location of said article and said mold, withdrawing said relief conduit from said article, and then removing the article from said mold.

9. In the process of blow molding including introducing air under pressure into a heated plastic tube within the chamber of a mold for expanding said tube into contact with the internal walls of said mold chamber, the improvement comprising the steps of piercing the plastic with an exhaust needle after the plastic has been expanded into contact with the walls of the mold chamber by inserting an exhaust needle into the mold chamber at a location removed from the location of the introduction of air, introducing a continuous flow of cool air into the internal cavity formed within the expanded plastic, controlling the outflow through said exhaust needle for maintaining an increased pressure within said expanded plastic for maintaining the plastic in contact with the internal walls of the mold, withdrawing the exhaust needle from the chamber of the mold, and removing the plastic from the mold.

10. In a blow molding apparatus including a pair of cooperating mold sections movable into engagement for forming an internal mold cavity, extrusion means having an extrusion head for introducing a heated plastic tube into said cavity and air injection means coaxial to said extrusion head; the improvement comprising a hollow exhaust needle, means mounting said exhaust needle for axial movement at a location removed from said air injection means between an active position with the point of said needle extending into said cavity and an inactive position with the point of the needle removed from said cavity, said needle having a sharp end for piercing plastic positioned against the walls of said cavity as said needle is moved from its active to its inactive position, and pressure control means controlling the exhaust of air from said chamber through said exhaust needle.

11. In a molding apparatus according to claim 10, the improvement further including actuation means for driving said exhaust needle between its active and inactive positions, and control means coordinating the movement of said exhaust needle with the operation of the extrusion means and the movable mold section for moving said exhaust needle into the mold cavity during a molding operation.

References Cited in the file of this patent

UNITED STATES PATENTS

| 2,348,738 | Hofmann | May 16, 1944 |
| 2,792,593 | Hardgrove | May 21, 1957 |
| 2,903,740 | Parfrey | Sept. 15, 1959 |

FOREIGN PATENTS

| 1,244,287 | France | Sept. 12, 1960 |